US012684637B2

(12) United States Patent
Wu et al.

(10) Patent No.: US 12,684,637 B2
(45) Date of Patent: Jul. 14, 2026

(54) TECHNIQUES FOR RECOVERY FROM A DUAL CONNECTIVITY DATA STALL

(71) Applicant: QUALCOMM Incorporated, San Diego, CA (US)

(72) Inventors: Peng Wu, Shanghai (CN); Shailesh Maheshwari, San Diego, CA (US); Yong Hou, Beijing (CN); Arun Prasanth Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/044,034

(22) PCT Filed: Nov. 5, 2020

(86) PCT No.: PCT/CN2020/126662
§ 371 (c)(1),
(2) Date: Mar. 3, 2023

(87) PCT Pub. No.: WO2022/094832
PCT Pub. Date: May 12, 2022

(65) Prior Publication Data
US 2024/0023180 A1      Jan. 18, 2024

(51) Int. Cl.
*H04L 1/1607* (2023.01)
*H04W 28/06* (2009.01)
*H04W 76/15* (2018.01)

(52) U.S. Cl.
CPC ........... *H04W 76/15* (2018.02); *H04L 1/1642* (2013.01); *H04W 28/06* (2013.01)

(58) Field of Classification Search
CPC ....... H04L 47/34; H04L 43/026; H04L 43/08; H04L 43/0864; H04L 43/087;
(Continued)

(56) References Cited

U.S. PATENT DOCUMENTS

| | | | | |
|---|---|---|---|---|
| 10,383,159 B2 * | 8/2019 | Yi | ......................... | H04W 76/14 |
| 10,721,650 B2 * | 7/2020 | Kim | ...................... | H04W 72/23 |

(Continued)

FOREIGN PATENT DOCUMENTS

| | | |
|---|---|---|
| CN | 1992652 A | 7/2007 |
| CN | 110943933 A | 3/2020 |

(Continued)

OTHER PUBLICATIONS

Supplementary European Search Report—EP20960294—Search Authority—The Hague—Sep. 18, 2024.
(Continued)

*Primary Examiner* — Nathan S Taylor

(74) *Attorney, Agent, or Firm* — Harrity & Harrity, LLP

(57) ABSTRACT

Various aspects of the present disclosure generally relate to wireless communication. In some aspects, a user equipment (UE) may receive, via a first connection of a dual connectivity mode, a first packet having a first sequence number. The UE may receive, via a second connection of the dual connectivity mode, a second packet having a second sequence number. The UE may determine, based at least in part on the first sequence number and the second sequence number, that the first packet is received out of order. The UE may maintain a packet order for reception of subsequent packets via the first connection or the second connection. The UE may drop the first packet based at least in part on the determination that the first packet is received out of order. Numerous other aspects are provided.

30 Claims, 9 Drawing Sheets

(58) Field of Classification Search

CPC ... H04L 43/0876; H04L 47/125; H04L 47/24; H04L 47/41; H04L 69/22; H04L 69/329; H04L 1/1628; H04L 1/1685; H04L 1/188; H04L 1/1883; H04L 2001/0093; H04L 47/19; H04L 47/30; H04L 47/624; H04L 49/9057; H04L 69/16; H04L 69/166; H04L 69/32; H04L 69/321; H04L 69/322; H04L 47/40; H04L 1/1642; H04L 1/1607; H04W 28/0263; H04W 28/0268; H04W 28/0289; H04W 72/0453; H04W 76/16; H04W 80/02; H04W 88/06; H04W 24/10; H04W 28/0205; H04W 28/0252; H04W 28/0278; H04W 28/065; H04W 72/0446; H04W 76/11; H04W 8/04; H04W 84/042; H04W 84/12; H04W 88/10; H04W 24/02; H04W 28/02; H04W 72/04; H04W 72/12; H04W 28/06; H04W 28/082; H04W 28/0865; H04W 28/09; H04W 76/15

USPC .......................................................... 370/329

See application file for complete search history.

(56) References Cited

U.S. PATENT DOCUMENTS

| | | | | |
|---|---|---|---|---|
| 2012/0147869 | A1* | 6/2012 | Chhatriwala | H04W 28/065 370/338 |
| 2012/0183142 | A1* | 7/2012 | Sharma | H04W 76/19 380/273 |
| 2015/0117357 | A1* | 4/2015 | Ozturk | H04W 28/0205 370/329 |
| 2016/0066362 | A1* | 3/2016 | Ohta | H04W 76/15 370/331 |
| 2016/0277957 | A1* | 9/2016 | Patel | H04W 76/16 |
| 2017/0041767 | A1* | 2/2017 | Vajapeyam | H04W 72/04 |
| 2017/0064707 | A1* | 3/2017 | Xiao | H04L 1/188 |
| 2017/0187629 | A1* | 6/2017 | Shalev | H04L 45/72 |
| 2017/0264562 | A1* | 9/2017 | Yi | H04L 47/34 |
| 2018/0097720 | A1* | 4/2018 | Jaffer | H04L 67/142 |
| 2018/0234839 | A1* | 8/2018 | Tenny | H04W 36/0033 |
| 2018/0359657 | A1* | 12/2018 | Kim | H04W 28/06 |
| 2019/0090156 | A1* | 3/2019 | Kim | H04L 67/12 |
| 2019/0253926 | A1* | 8/2019 | Kim | H04L 1/08 |
| 2019/0364417 | A1* | 11/2019 | Patil | H04W 8/04 |
| 2020/0045533 | A1* | 2/2020 | Varanasi | G06F 16/27 |
| 2020/0314690 | A1* | 10/2020 | Kim | H04W 4/70 |
| 2020/0382431 | A1* | 12/2020 | Decarreau | H04L 1/08 |
| 2021/0153021 | A1* | 5/2021 | Kimba Dit Adamou | H04W 12/106 |
| 2022/0377602 | A1* | 11/2022 | Kim | H04W 28/06 |
| 2023/0042357 | A1* | 2/2023 | Xu | H04L 1/08 |
| 2023/0180349 | A1* | 6/2023 | Zhu | H04W 4/06 370/312 |
| 2023/0224252 | A1* | 7/2023 | Zacharias | H04L 47/34 370/235 |
| 2023/0388891 | A1* | 11/2023 | Wu | H04W 36/00692 |
| 2024/0063978 | A1* | 2/2024 | Falkenberg | H04W 72/23 |
| 2024/0381443 | A1* | 11/2024 | Kim | H04W 36/185 |
| 2025/0159757 | A1* | 5/2025 | Li | H04W 24/10 |

FOREIGN PATENT DOCUMENTS

| | | | | |
|---|---|---|---|---|
| EP | 3402304 | B1 * | 2/2020 | ......... H04W 72/121 |
| EP | 4009603 | A1 * | 6/2022 | ............ H04L 69/40 |
| EP | 3652983 | B1 * | 2/2024 | ....... H04W 28/0278 |
| WO | WO-2019204311 | A1 * | 10/2019 | .......... H04L 53/026 |
| WO | 2020093915 | | 5/2020 | |
| WO | WO-2020093230 | A1 * | 5/2020 | |

OTHER PUBLICATIONS

Ericsson: "Email Discussion [107#27] [NR/R15] Determining L2 buffer size (Ericsson)", 3GPP TSG-RAN WG2 #107bis, Tdoc R2-1913532, Chongqing, China, Oct. 14-18, 2019, Oct. 4, 2019, pp. 1-12.

Supplementary Partial European Search Report—EP20960294—Search Authority—The Hague—Jun. 7, 2024.

Ericsson: "Email Discussion [107# 27][NR/R15] Determining L2 Buffer Size (Ericsson)", 3GPP TSG-RAN WG2 #107bis Tdoc, R2-1913532, Oct. 3, 2019 (Oct. 3, 2019), 9 Pages, sections 2.2-2.3.

International Search Report and Written Opinion—PCT/CN2020/126662—ISA/EPO—Aug. 4, 2021.

* cited by examiner

400

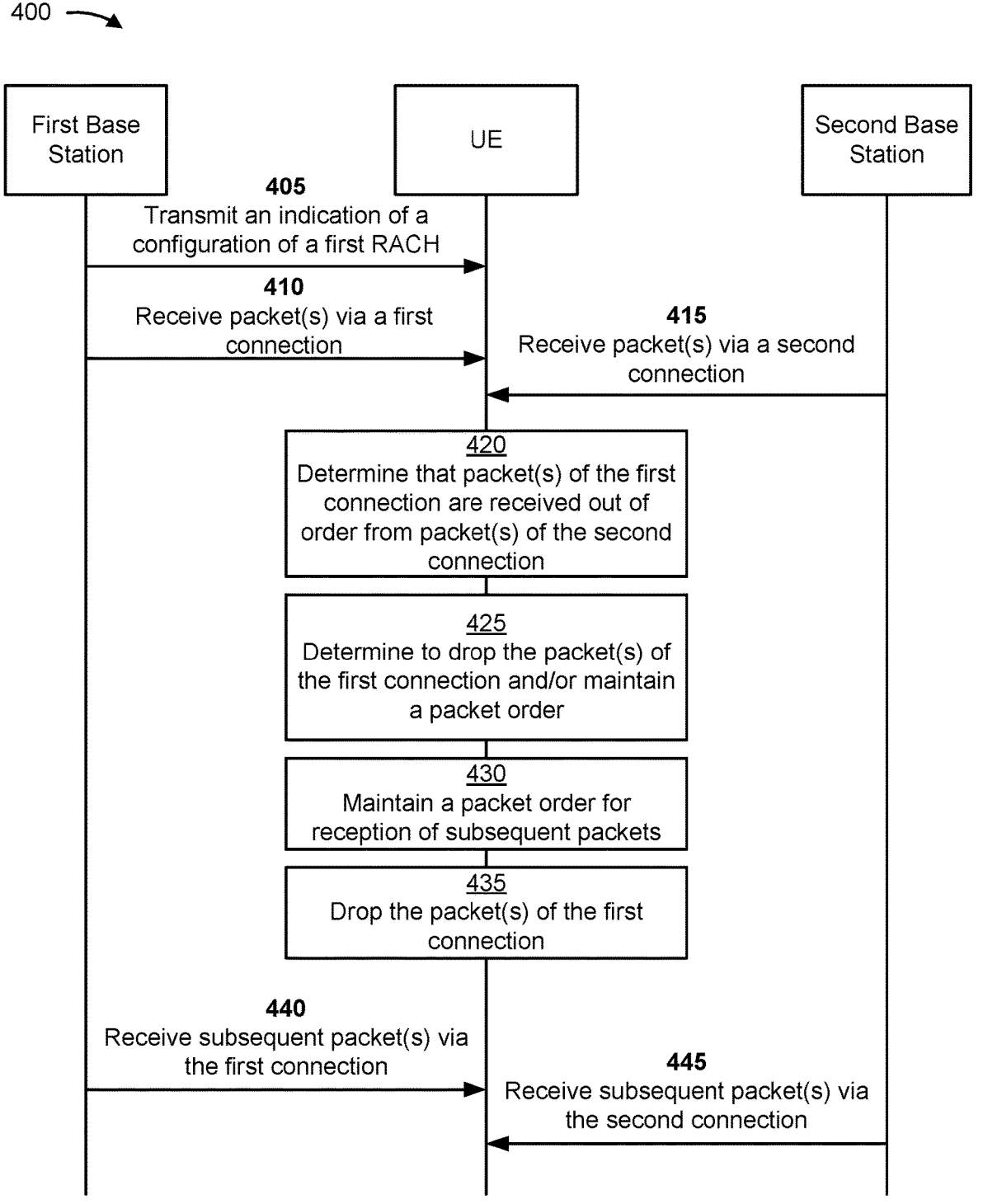

First Base Station

UE

Second Base Station

405
Transmit an indication of a
configuration of a first RACH

410
Receive packet(s) via a first
connection

415
Receive packet(s) via a second
connection

420
Determine that packet(s) of the first
connection are received out of
order from packet(s) of the second
connection

425
Determine to drop the packet(s) of
the first connection and/or maintain
a packet order

430
Maintain a packet order for
reception of subsequent packets

435
Drop the packet(s) of the first
connection

440
Receive subsequent packet(s) via
the first connection

445
Receive subsequent packet(s) via
the second connection

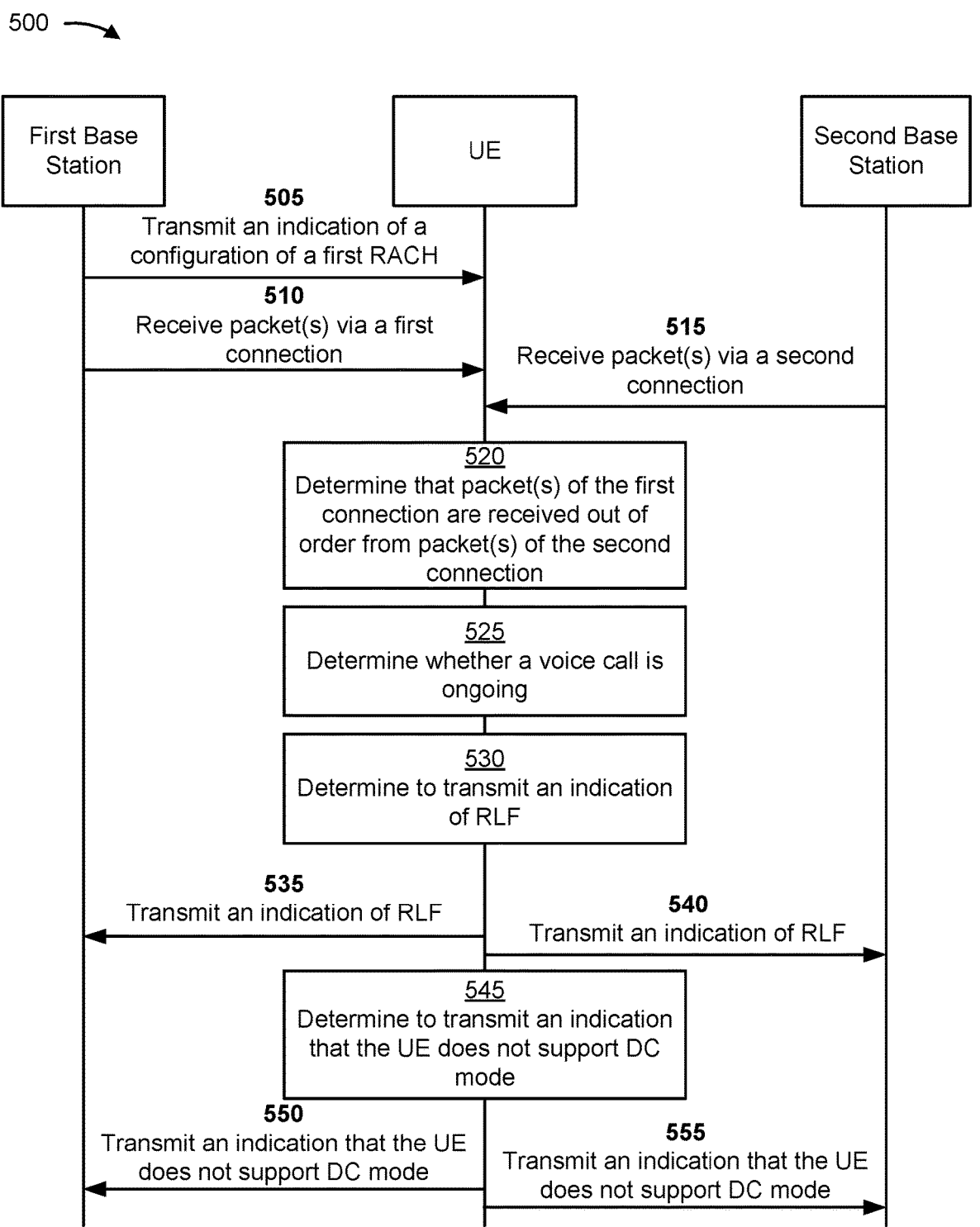

First Base
Station

UE

Second Base
Station

505
Transmit an indication of a
configuration of a first RACH

510
Receive packet(s) via a first
connection

515
Receive packet(s) via a second
connection

520
Determine that packet(s) of the first
connection are received out of
order from packet(s) of the second
connection 525
Determine whether a voice call is
ongoing 530
Determine to transmit an indication
of RLF

535
Transmit an indication of RLF

540
Transmit an indication of RLF

545
Determine to transmit an indication
that the UE does not support DC
mode

550
Transmit an indication that the UE
does not support DC mode

555
Transmit an indication that the UE
does not support DC mode

FIG. 5

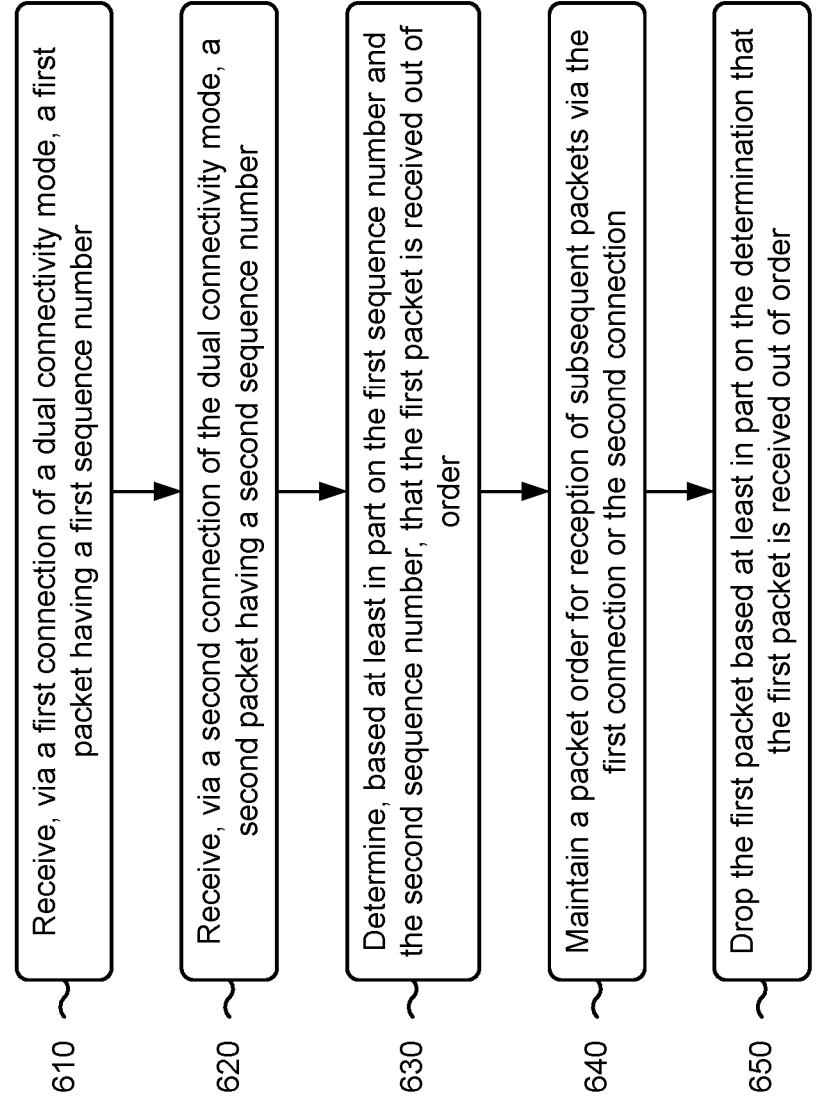

610   Receive, via a first connection of a dual connectivity mode, a first packet having a first sequence number 620   Receive, via a second connection of the dual connectivity mode, a second packet having a second sequence number 630   Determine, based at least in part on the first sequence number and the second sequence number, that the first packet is received out of order 640   Maintain a packet order for reception of subsequent packets via the first connection or the second connection 650   Drop the first packet based at least in part on the determination that the first packet is received out of order

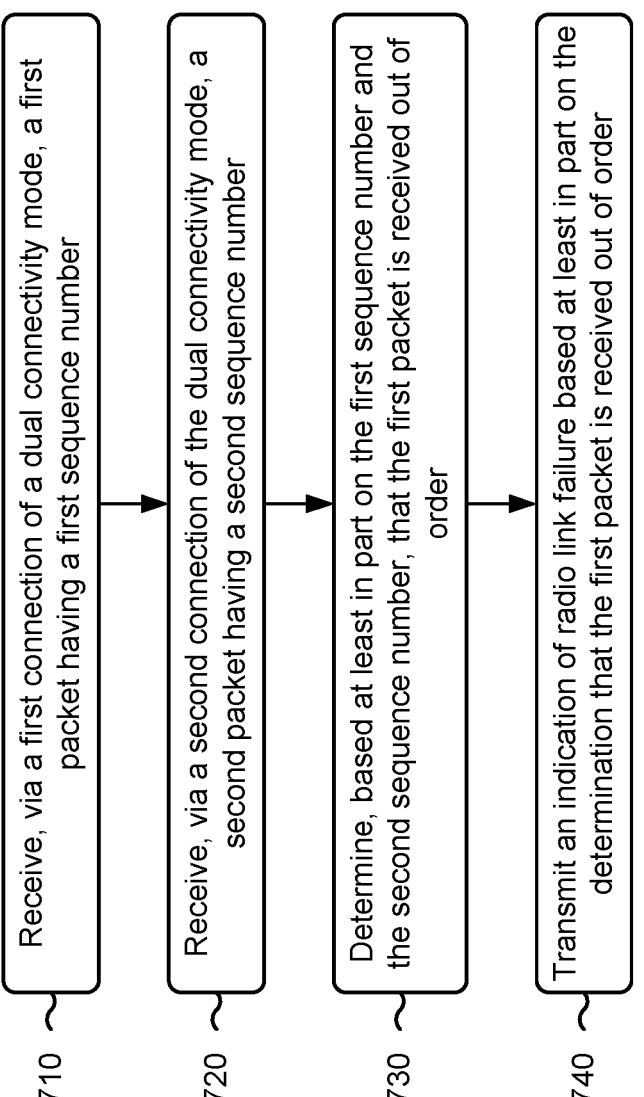

Receive, via a first connection of a dual connectivity mode, a first packet having a first sequence number Receive, via a second connection of the dual connectivity mode, a second packet having a second sequence number Determine, based at least in part on the first sequence number and the second sequence number, that the first packet is received out of order Transmit an indication of radio link failure based at least in part on the determination that the first packet is received out of order

TECHNIQUES FOR RECOVERY FROM A DUAL CONNECTIVITY DATA STALL

CROSS-REFERENCE TO RELATED APPLICATION

This application is a 371 national stage of Patent Cooperation Treaty (PCT) Application No. PCT/CN2020/126662 filed on Nov. 5, 2020, entitled "TECHNIQUES FOR RECOVERY FROM A DUAL CONNECTIVITY DATA STALL," which is hereby expressly incorporated by reference herein.

FIELD OF THE DISCLOSURE

Aspects of the present disclosure generally relate to wireless communication and to techniques and apparatuses for recovery from a dual connectivity data stall.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, via a first connection of a dual connectivity mode, a first packet having a first sequence number; receiving, via a second connection of the dual connectivity mode, a second packet having a second sequence number; determining, based at least in part on the first sequence number and the second sequence number, that the first packet is received out of order; maintaining a packet order for reception of subsequent packets via the first connection or the second connection; and dropping the first packet based at least in part on the determination that the first packet is received out of order.

In some aspects, the determination that the first packet is received out of order comprises determining a first value of a first hyper frame number (HFN) counter that is associated with the first connection, determining a second value of a second HFN counter that is associated with the second connection, determining that the first value passes an HFN decipher associated with the first HFN counter, and determining that the second value passes an HFN decipher associated with the second HFN counter.

In some aspects, the method includes determining to drop the first packet and maintain the packet order for reception of subsequent packets based at least in part on the first value being a valid HFN number.

In some aspects, the method includes determining that the first packet is a stale packet based at least in part on the first sequence number and the second sequence number.

In some aspects, the maintenance of the packet order for reception of subsequent packets comprises maintaining a reception window for reception of the subsequent packets.

In some aspects, the first connection is associated with a first radio access technology (RAT) and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, a method of wireless communication performed by a UE includes receiving, via a first connection of a dual connectivity mode, a first packet having a first sequence number; receiving, via a second connection of the dual connectivity mode, a second packet having a second sequence number; determining, based at least in part on the first sequence number and the second sequence number, that the first packet is received out of order; and transmitting an indication of radio link failure based at least in part on the determination that the first packet is received out of order.

In some aspects, the method includes determining that a voice call is ongoing via the first connection or the second connection; and determining to transmit the indication of radio link failure after the voice call is ended.

In some aspects, the method includes determining a number of packets, including the first packet, that have been received out of order via the first connection; determining that the number of packets satisfies an out of order threshold; and determining to transmit the indication of radio link failure based at least in part on the number satisfying the out of order threshold.

In some aspects, the method includes determining a number of transmissions of the indication of radio link failure; determining that the number satisfies a radio link failure threshold; and determining to transmit an indication that the UE does not support dual connectivity.

In some aspects, the method includes determining a number of transmissions of the indication of radio link failure; determining that the number satisfies a radio link failure threshold; and determining to omit a measurement report for a dual connectivity second cell group cell addition procedure.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, a UE for wireless communication includes a memory; and one or more processors operatively coupled to the memory, the memory and the one or more processors configured to receive, via a first connection of a dual connectivity mode, a first packet having a first sequence number; receive, via a second connection of the dual connectivity mode, a second packet having a second sequence number; determine, based at least in part on the first sequence number and the second sequence number, that the first packet is received out of order; maintain a packet order for reception of subsequent packets via the first connection or the second connection; and drop the first packet based at least in part on the determination that the first packet is received out of order.

In some aspects, the determination that the first packet is received out of order comprises a determination of a first value of a first HFN counter that is associated with the first connection, a determination of a second value of a second HFN counter that is associated with the second connection, a determination that the first value passes an HFN decipher, and a determination that the second value passes an HFN decipher associated with the second HFN counter.

In some aspects, the one or more processors are further configured to determine that the first packet is a stale packet based at least in part on the first sequence number and the second sequence number.

In some aspects, the maintenance of the packet order for reception of subsequent packets comprises maintenance of a reception window for reception of the subsequent packets.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, a UE for wireless communication includes a memory; and one or more processors operatively coupled to the memory, the memory and the one or more processors configured to receive, via a first connection of a dual connectivity mode, a first packet having a first sequence number; receive, via a second connection of the dual connectivity mode, a second packet having a second sequence number; determine, based at least in part on the first sequence number and the second sequence number, that the first packet is received out of order; and transmit an indication of radio link failure based at least in part on the determination that the first packet is received out of order.

In some aspects, the one or more processors are further configured to determine that a voice call is ongoing via the first connection or the second connection; and determine to transmit the indication of radio link failure after the voice call is ended.

In some aspects, the one or more processors are further configured to determine a number of packets, including the first packet, that have been received out of order via the first connection; determine that the number of packets satisfies an out of order threshold; and determine to transmit the indication of radio link failure based at least in part on the number satisfying the out of order threshold.

In some aspects, the one or more processors are further configured to determine a number of transmissions of the indication of radio link failure; determine that the number satisfies a radio link failure threshold; and determine to transmit an indication that the UE does not support dual connectivity.

In some aspects, the one or more processors are further configured to determine a number of transmissions of the indication of radio link failure; determine that the number satisfies a radio link failure threshold; and determine to omit a measurement report for a dual connectivity second cell group cell addition procedure.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, a non-transitory computer-readable medium storing a set of instructions for wireless communication includes one or more instructions that, when executed by one or more processors of a UE, cause the UE to receive, via a first connection of a dual connectivity mode, a first packet having a first sequence number; receive, via a second connection of the dual connectivity mode, a second packet having a second sequence number; determine, based at least in part on the first sequence number and the second sequence number, that the first packet is received out of order; maintain a packet order for reception of subsequent packets via the first connection or the second connection; and drop the first packet based at least in part on the determination that the first packet is received out of order.

In some aspects, the determination that the first packet is received out of order comprises a determination of a first value of a first HFN counter that is associated with the first connection, a determination of a second value of a second HFN counter that is associated with the second connection, a determination that the first value passes an HFN decipher, and a determination that the second value passes an HFN decipher associated with the second HFN counter.

In some aspects, the one or more instructions further cause the UE to determine that the first packet is a stale packet based at least in part on the first sequence number and the second sequence number.

In some aspects, the maintenance of the packet order for reception of subsequent packets comprises maintenance of a reception window for reception of the subsequent packets.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, a non-transitory computer-readable medium storing a set of instructions for wireless communication includes one or more instructions that, when executed by one or more processors of an UE, cause the UE to receive, via a first connection of a dual connectivity mode, a first packet having a first sequence number; receive, via a second connection of the dual connectivity mode, a second packet having a second sequence number; determine, based at least in part on the first sequence number and the second sequence number, that the first packet is received out of order; and transmit an indication of radio link failure based at least in part on the determination that the first packet is received out of order.

In some aspects, the one or more instructions further cause the UE to determine that a voice call is ongoing via the first connection or the second connection; and determine to transmit the indication of radio link failure after the voice call is ended.

In some aspects, the one or more instructions further cause the UE to determine a number of packets, including the first packet, that have been received out of order via the first connection; determine that the number of packets satisfies an out of order threshold; and determine to transmit the indication of radio link failure based at least in part on the number satisfying the out of order threshold.

In some aspects, the one or more instructions further cause the UE to determine a number of transmissions of the indication of radio link failure; determine that the number satisfies a radio link failure threshold; and determine to transmit an indication that the UE does not support dual connectivity.

In some aspects, the one or more instructions further cause the UE to determine a number of transmissions of the indication of radio link failure; determine that the number satisfies a radio link failure threshold; and determine to omit a measurement report for a dual connectivity second cell group cell addition procedure.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, an apparatus for wireless communication includes means for receiving, via a first connection of a dual connectivity mode, a first packet having a first sequence number; means for receiving, via a second connection of the dual connectivity mode, a second packet having a second sequence number; means for determining, based at least in part on the first sequence number and the second sequence number, that the first packet is received out of order; means for maintaining a packet order for reception of subsequent packets via the first connection or the second connection; and means for dropping the first packet based at least in part on the determination that the first packet is received out of order.

In some aspects, the means for determining that the first packet is received out of order comprises means for determining a first value of a first HFN counter that is associated with the first connection, means for determining a second value of a second HFN counter that is associated with the second connection, means for determining that the first value passes an HFN and means for determining that the second value passes an HFN decipher associated with the second HFN counter.

In some aspects, the apparatus includes means for determining that the first packet is a stale packet based at least in part on the first sequence number and the second sequence number.

In some aspects, the means for maintaining the packet order for reception of subsequent packets comprises means for maintaining a reception window for reception of the subsequent packets.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

In some aspects, an apparatus for wireless communication includes means for receiving, via a first connection of a dual connectivity mode, a first packet having a first sequence number; means for receiving, via a second connection of the dual connectivity mode, a second packet having a second sequence number; means for determining, based at least in part on the first sequence number and the second sequence number, that the first packet is received out of order; and means for transmitting an indication of radio link failure based at least in part on the determination that the first packet is received out of order.

In some aspects, the apparatus includes means for determining that a voice call is ongoing via the first connection or the second connection; and means for determining to transmit the indication of radio link failure after the voice call is ended.

In some aspects, the apparatus includes means for determining a number of packets, including the first packet, that have been received out of order via the first connection; means for determining that the number of packets satisfies an out of order threshold; and means for determining to transmit the indication of radio link failure based at least in part on the number satisfying the out of order threshold.

In some aspects, the apparatus includes means for determining a number of transmissions of the indication of radio link failure; means for determining that the number satisfies a radio link failure threshold; and means for determining to transmit an indication that the apparatus does not support dual connectivity.

In some aspects, the apparatus includes means for determining a number of transmissions of the indication of radio link failure; means for determining that the number satisfies a radio link failure threshold; and means for determining to omit a measurement report for a dual connectivity second cell group cell addition procedure.

In some aspects, the first connection is associated with a first RAT and the second connection is associated with a second RAT that is different from the first RAT.

In some aspects, the first connection is associated with a first frequency bandwidth and the second connection is associated with a second frequency bandwidth that is different from the first frequency bandwidth.

In some aspects, the determination that the first packet is received out of order is based at least in part on the first sequence number and the second sequence number satisfying a sequence number threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4 and 5 are diagrams illustrating examples associated with recovery from a dual connectivity data stall, in accordance with various aspects of the present disclosure.

FIGS. 6 and 7 are diagrams illustrating example processes associated with recovery from a dual connectivity data stall, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
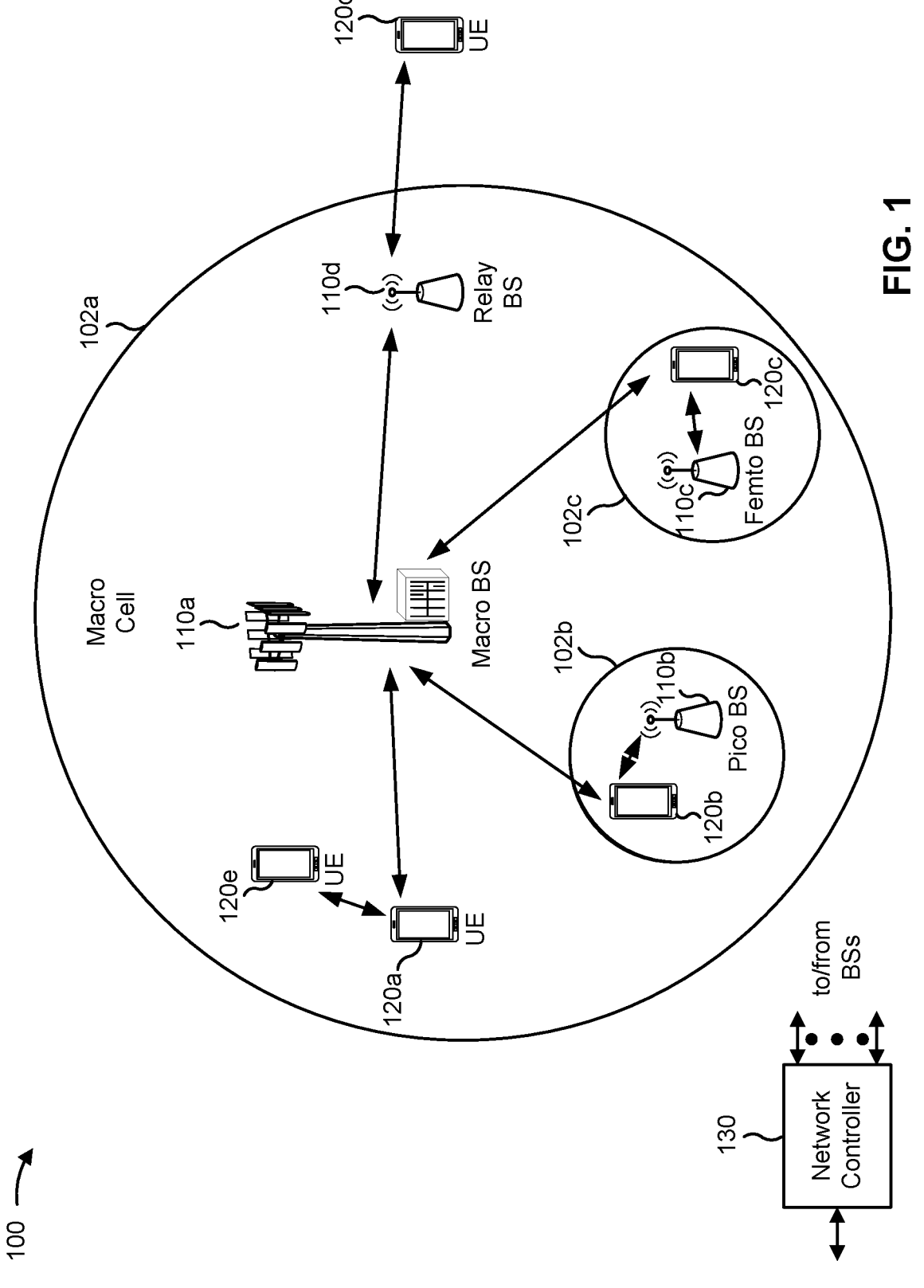
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
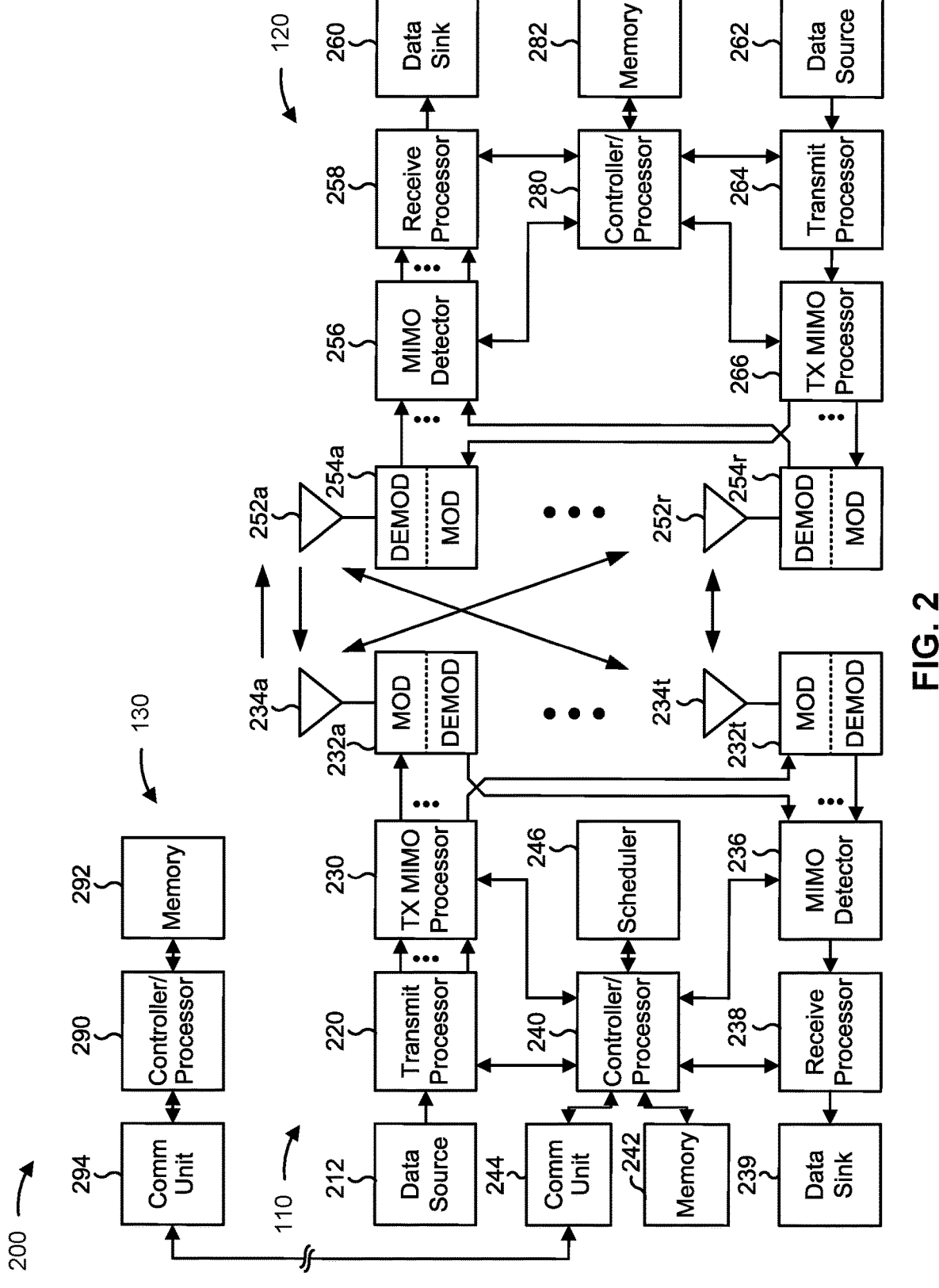
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor"

may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with recovery from a dual connectivity data stall, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving, via a first connection of a dual connectivity mode, a first packet having a first sequence number; means for receiving, via a second connection of the dual connectivity mode, a second packet having a second sequence number; means for determining, based at least in part on the first sequence number and the second sequence number, that the first packet is received out of order; means for maintaining a packet order for reception of subsequent packets via the first connection or the second connection; or means for dropping the first packet based at least in part on the determination that the first packet is received out of order. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a first value of a first HFN counter that is associated with the first connection, means for determining a second value of a second HFN counter that is associated with the second connection, means for determining that the first value passes an HFN decipher associated with the first HFN counter, and means for determining that the second value passes an HFN decipher associated with the second HFN counter.

In some aspects, the UE includes means for determining to drop the first packet and maintain the packet order for reception of subsequent packets based at least in part on the first value being a valid HFN number.

In some aspects, the UE includes means for determining that the first packet is a stale packet based at least in part on the first sequence number and the second sequence number.

In some aspects, the UE includes means for maintaining a reception window for reception of the subsequent packets.

In some aspects, the UE includes means for receiving, via a first connection of a dual connectivity mode, a first packet having a first sequence number; means for receiving, via a second connection of the dual connectivity mode, a second packet having a second sequence number; means for determining, based at least in part on the first sequence number and the second sequence number, that the first packet is received out of order; or means for transmitting an indication of radio link failure based at least in part on the determination that the first packet is received out of order. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that a voice call is ongoing via the first connection or the second connection; or means for determining to transmit the indication of radio link failure after the voice call is ended.

In some aspects, the UE includes means for determining a number of packets, including the first packet, that have been received out of order via the first connection; means for determining that the number of packets satisfies an out of order threshold; or means for determining to transmit the indication of radio link failure based at least in part on the number satisfying the out of order threshold.

In some aspects, the UE includes means for determining a number of transmissions of the indication of radio link failure; means for determining that the number satisfies a radio link failure threshold; or means for determining to transmit an indication that the UE does not support dual connectivity.

In some aspects, the UE includes means for determining a number of transmissions of the indication of radio link failure; means for determining that the number satisfies a radio link failure threshold; or means for determining to omit a measurement report for a dual connectivity second cell group cell addition procedure.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
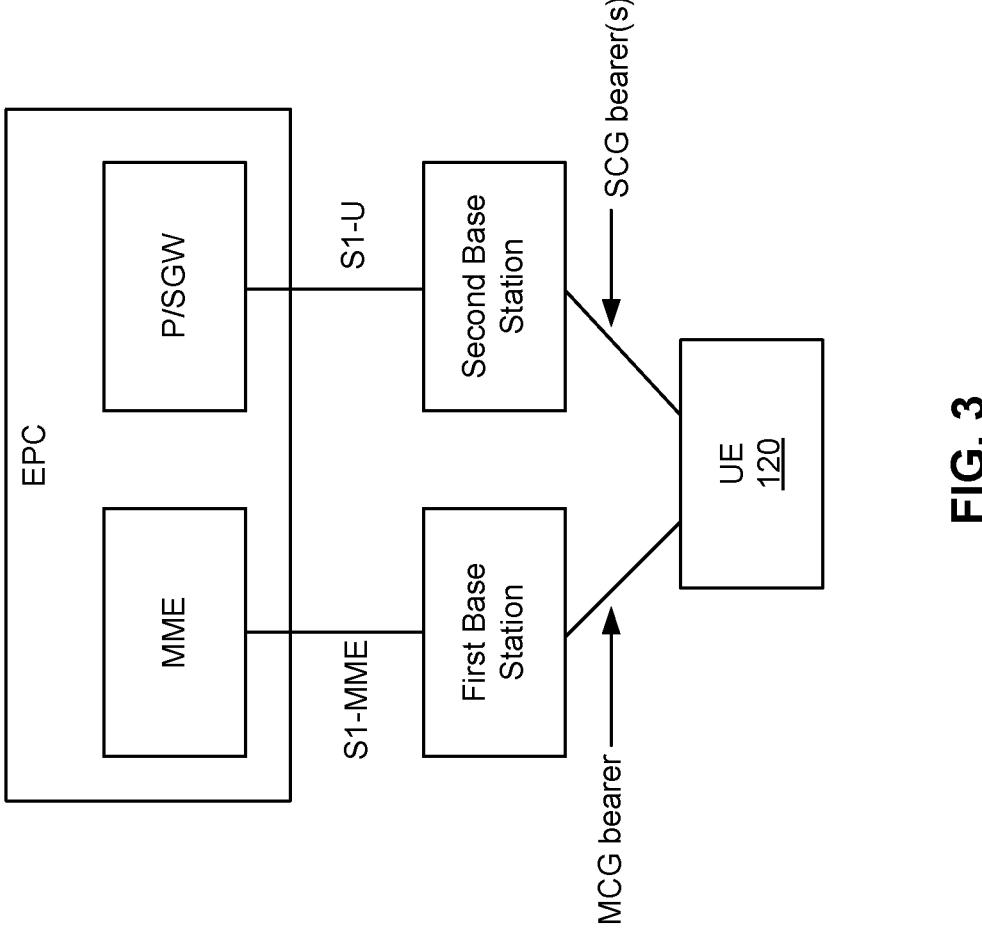
FIG. 3 is a diagram illustrating an example of dual connectivity, in accordance with various aspects of the present disclosure.

FIG. 3 is a diagram illustrating an example 300 of dual connectivity, in accordance with various aspects of the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode.

As shown in FIG. 3, a UE 120 may communicate with both a first base station (e.g., an eNB, a 4G base station 110, a gNB, or a 5G base station 110, among other examples) and a second base station (e.g., an eNB, a 4G base station 110, a gNB, or a 5G base station 110, among other examples), and the first base station and the second base station may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the first base station and the second base station may be co-located at the same base station. In some aspects, the first base station and the second base station may be included in different base stations (e.g., may not be co-located).

As further shown in FIG. 3, in some aspects, a wireless network that permits operation in a 5G NSA mode may permit such operations using an MCG for a first RAT (e.g., an LTE RAT, a 4G RAT, and/or the like) and an SCG for a second RAT (e.g., an NR RAT, a 5G RAT, and/or the like). In this case, the UE 120 may communicate with the first base station via the MCG, and the UE 120 may communicate with the second base station via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the second base station and the first base station may not transfer user plane information between one another. In some aspects, a UE 120 operating in a dual connectivity mode may be concurrently connected with an LTE base station (e.g., an eNB) and an NR base station (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band), and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

In some networks, a UE may operate in a dual connectivity mode. When in the dual connectivity mode, the UE may communicate via a first connection (e.g., a first leg, a first radio link connection (RLC) entity leg, an MCG, or an SCG, among other examples) and a second connection (e.g., a second leg or a second RLC entity leg, among other examples). In some dual connectivity modes, the first connection may operate using a first RAT, and the second connection may operate using a second RAT. In some dual connectivity modes, the first connection may operate using a first bandwidth (e.g., a sub-6 GHz bandwidth), and the second connection may operate using a second bandwidth (e.g., a millimeter wave bandwidth).

The first connection may operate with slower connection (e.g., a lower bandwidth or a higher latency, among other examples). The second connection may operate with a faster connection (e.g., a higher bandwidth or a lower latency, among other examples). The UE may receive one or more first packets associated with a set of first sequence numbers via the first connection and may receive one or more second packets associated with a second set of sequence numbers via the second connection. Based at least in part on the first connection operating with a slower connection than the second connection, the first set of sequence numbers (e.g., when compared with the second set of sequence numbers) may indicate that the one or more first packets are out of order from the one or more second packets. This may trigger a data stall, such as a reception window update (e.g., to fit the one or more first packets based at least in part on the first sequence number), which may cause the UE to drop (e.g., discard) the one or more second packets and/or one or more subsequent packets received via the second connection. Additionally, or alternatively, the UE may cause a data stall, such as an update of a hyper frame number (HFN) based at least in part on the first sequence number, which may cause errors in reception of subsequent packets received via the second connection. Based at least in part on the data stall, the UE may consume computing, network, communication, and/or power resources to detect and correct dropped packets and/or errors in reception of subsequent packets.

In some aspects described herein, the UE may receive a first packet via a first connection of a dual connectivity mode. The first packet may have a first sequence number. The UE may receive a second packet via a second connection of the dual connectivity mode. The second packet may have a second sequence number. In some aspects, the UE may determine that the first packet is received out of order based at least in part on the first sequence number and the second sequence number.

In some aspects, the UE may determine that the first packet is received out of order with the second packet based at least in part on the UE maintaining a first HFN counter associated with the first connection (e.g., a dual connectivity radio link connection (RLC) entity may maintain the first HFN counter) and based at least in part on the UE maintaining a second HFN counter associated with the second connection (e.g., the dual connectivity RLC entity may maintain the second HFN counter). In some aspects, the UE may determine that the first packet is received in order for data packets of the first connection based on the HFN counter, but that the first packet is received out of order with the second connection (e.g., the first packet is stale) based at least in part on the first sequence number.

In some aspects, based at least in part on a determination that the first packet is in order for data packets of the first connection and out of order for data packets of the second connection (e.g., the first packet is stale), the UE may drop the first packet (e.g., discard one or more additional packets of the first connection), and the UE may maintain a packet order for reception of subsequent packets via the first connection and/or the second connection. In other words, the UE may not trigger a packet data convergence protocol (PDCP) reorder process.

In some aspects, based at least in part on a determination that the first packet is received out of order, the UE may transmit an indication of a radio link failure. In some aspects, the UE may first determine whether a voice call (e.g., a voice over LTE or a voice over NR, among other examples) is ongoing. Based at least in part on a determination that a voice call is ongoing, the UE may determine to wait until the voice call is ended before transmitting the indication of the radio link failure. In some aspects, the UE may transmit the indication of radio link failure after a determination that a number of packets that have been received out of order via the first connection satisfies an out of order threshold.

In some aspects, the UE may determine that a number of transmissions of the indication of radio link failure (e.g., based at least in part on packets of the first connection being received out of order with packets of the second connection) satisfies a radio link failure threshold. In some aspects, the UE may transmit an indication that the UE does not support dual connectivity and/or may determine to omit a measurement report for a dual connectivity second cell group cell addition procedure.

Based at least in part on dropping the first packet and maintaining the packet order for reception of subsequent packets and/or based at least in part on transmitting an indication of radio link failure, the UE may continue to communicate via the second connection without updating a reception window or an HFN to match stale packets of the first connection. In this way, the UE may conserve computing, network, communication, and/or power resources that may have otherwise been used to detect and correct dropped packets and/or errors in reception of subsequent packets based at least in part on the first packet being received out of order.

FIG. 4 is a diagram illustrating an example 400 associated with dynamic joint indications of a DMRS configuration and a physical uplink channel transmission mode, in accordance with various aspects of the present disclosure. As shown in FIG. 4, a UE (e.g., UE 120) may communicate with a first base station (e.g., base station 110) and a second base station (e.g., base station 110). In some aspects, the UE, the first base station, and the second base station may be part of one or more wireless networks (e.g., wireless network 100). In some aspects, the UE may communicate with the first base station and the second base station in a dual connectivity mode (e.g., as described with reference to FIG. 3). For example, the UE may communicate with the first base station using a first radio access technology (e.g., LTE) and with the second base station using a second radio access technology (e.g., NR) in dual connectivity mode. Additionally, or alternatively, the UE may communicate with the first base station using a first frequency bandwidth (e.g., a sub-6 GHz bandwidth) and with the second base station using a second frequency bandwidth (e.g., a millimeter wave bandwidth) in dual connectivity mode.

As shown by reference number 405, the first base station may transmit, and the UE may receive, configuration information (e.g., via a first connection). In some aspects, the UE may receive configuration information from another device (e.g., from the second base station, another base station, and/or another UE) and/or determine the configuration information from a communication standard (e.g., already known to the UE), among other examples. In some aspects, the UE may receive the configuration information via one or more of RRC signaling, one or more medium access control (MAC) control elements (MAC-CEs), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to report capability to support a dual connectivity mode (e.g., via RRC signaling), to measure reference signals, and/or to provide a measurement report to support a dual connectivity mode. For example, the configuration information may indicate that the UE is to provide a measurement report for a dual connectivity SCG cell addition to support addition of a second connection with the second base station. In some aspects, the configuration information may indicate that the UE is to determine whether data packets of the first connection are out of order with data packets of the second connection. In some aspects, the configuration information may indicate that the UE is to maintain a packet order (e.g., based at least in part on data packets of the second connection) for reception of subsequent packets and drop the data packets of the first connection. In some aspects, the configuration information may indicate that the UE is to transmit an indication of a radio link failure based at least in part on a determination that the data packets of the first connection are out of order with the data packets of the second connection.

The UE may configure the UE based at least in part on the configuration information. In some aspects, the UE may be configured to perform one or more operations described herein.

As shown by reference number 410, the UE may receive one or more packets via a first connection. In some aspects, the UE may receive a first packet having a first sequence number via a first connection of a dual connectivity mode.

As shown by reference number 415, the UE may receive one or more packets via a second connection. In some aspects, the UE may receive a second packet having a first sequence number via a first connection of a dual connectivity mode.

As shown by reference number 420, the UE may determine that the one or more packets of the first connection are received out of order from the one or more packets of the second connection. In some aspects, the UE may determine that the first packet is received out of order based at least in part on the first sequence number and the second sequence number. In some aspects, the UE may determine that the first packet is a stale packet based at least in part on the first sequence number and the second sequence number.

As shown by reference number 425, the UE may determine to drop the one or more packets of the first connection and/or to maintain a packet order. In some aspects, the UE may determine to drop the one or more packets of the first connection and maintain the packet order. In some aspects, the UE may determine to deliver the one or more packets of the first connection to an upper layer (e.g., to process the one or more packets) and to maintain the packet order (e.g., to avoid reordering a reception window for receiving subsequent packets).

In some aspects, the UE may determine to drop the one or more packets of the first connection and/or to maintain a packet order based at least in part on the one or more packets having one or more valid HFN numbers. In some aspects, the UE may determine that the first packet is out of order (e.g., stale or out of order with the second packet) based at least in part on maintaining an HFN counter associated with the first connection and a second HFN counter associated with the second connection. The UE may determine a first value of the first HFN counter and a second value of the second HFN counter and may determine that the first value passes an HFN decipher associated with the first HFN counter and that the second value passes an HFN decipher associated with the second HFN counter. In other words, the UE may use separate HFN counters for the first connection and the second connection to determine whether packets are in order within the first connection or the second connection, respectively. The UE may determine to drop the one or more packets of the first connection and maintain a packet order based at least in part on the one or more packets having one or more valid HFN numbers. The one or more packets may have one or more valid HFN numbers based at least in part on the one or more packets being in order within the first connection and out of order with the data packets of the second connection.

As shown by reference number 430, the UE may maintain a packet order for reception of subsequent packets via the first connection or the second connection. For example, the UE may maintain the packet order for reception of subsequent packets via the second connection even though the first sequence number may indicate that the UE should adjust the packet order to receive subsequent packets via the first connection. In some aspects, maintaining a packet order (e.g., a PDCP packet order) may include maintaining a reception window for reception of the subsequent packets.

In some aspects, the UE may deliver the one or more packets of the first connection to an upper layer (e.g., to process the one or more packets) and to maintain the packet order (e.g., to avoid reordering a reception window for receiving subsequent packets).

As shown by reference number 435, the UE may drop the one or more packets of the first connection. For example, the UE may drop the one or more packets of the first connection based at least in part on the determination that the first packet is received out of order (e.g., that the first packet is stale). In some aspects, the UE may have already received data of the first packet via a previously received packet of the second connection. In some aspects, the first packet may be obsolete because it is stale.

As shown by reference number 440, the UE may receive a subsequent one or more packets via the first connection. For example, the UE may receive the one or more packets via the first connection using a reception window that is based at least in part on sequence numbers of data packets received via the second connection.

As shown by reference number 445, the UE may receive subsequent one or more packets via the second connection. For example, the UE may receive the one or more packets via the second connection using a reception window that is based at least in part on sequence numbers of data packets received via the second connection.

Based at least in part on dropping the first packet and maintaining the packet order for reception of subsequent packets, the UE may continue to communicate via the second connection without updating a reception window or an HFN to match stale packets of the first connection. In this way, the UE may conserve computing, network, communication, and/or power resources that may have otherwise been used to detect and correct dropped packets and/or errors in reception of subsequent packets based at least in part on the first packet being received out of order.

As indicated above, FIG. 4 is provided as an example. Other examples may differ from what is described with respect to FIG. 4.

FIG. 5 is a diagram illustrating an example 500 associated with dynamic joint indications of a DMRS configuration and a physical uplink channel transmission mode, in accordance with various aspects of the present disclosure. As shown in FIG. 5, a UE (e.g., UE 120) may communicate with a first base station (e.g., base station 110) and a second base station (e.g., base station 110). In some aspects, the UE, the first base station, and the second base station may be part of one or more wireless networks (e.g., wireless network 100). In some aspects, the UE may communicate with the first base station and the second base station in a dual connectivity mode (e.g., as described with reference to FIG. 3). For example, the UE may communicate with the first base station using a first radio access technology (e.g., LTE) and with the second base station using a second radio access technology (e.g., NR) in dual connectivity mode. Additionally, or alternatively, the UE may communicate with the first base station using a first frequency bandwidth (e.g., a sub-6 GHz bandwidth) and with the second base station using a second frequency bandwidth (e.g., a millimeter wave bandwidth) in dual connectivity mode.

As shown by reference number 505, the first base station may transmit, and the UE may receive, configuration information (e.g., via a first connection). In some aspects, the UE may receive configuration information from another device (e.g., from the second base station, another base station and/or another UE) and/or determine the configuration information from a communication standard (e.g., already known to the UE), among other examples. In some aspects, the UE may receive the configuration information via one or more of RRC signaling, one or more MAC-CEs, and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to report capability to support a dual connectivity mode (e.g., via RRC signaling), to measure reference signals, and/or to provide a measurement report to support a dual connectivity mode. For example, the configuration information may indicate that the UE is to provide a measurement report for a dual connectivity SCG cell addition to support addition of a second connection with the second base station. In some aspects, the configuration information may indicate that the UE is to determine whether data packets of the first connection are out of order with data packets of the second connection. In some aspects, the configuration information may indicate that the UE is to maintain a packet order (e.g., based at least in part on data packets of the second connection) for reception of subsequent packets and drop the data packets of the first connection. In some aspects, the configuration information may indicate that the UE is to transmit an indication of a radio link failure based at least in part on a determination that the data packets of the first connection are out of order with the data packets of the second connection.

The UE may configure the UE based at least in part on the configuration information. In some aspects, the UE may be configured to perform one or more operations described herein.

As shown by reference number 510, the UE may receive one or more packets via a first connection. In some aspects, the UE may receive a first packet having a first sequence number via a first connection of a dual connectivity mode.

As shown by reference number 515, the UE may receive one or more packets via a second connection. In some aspects, the UE may receive a second packet having a first sequence number via a first connection of a dual connectivity mode.

As shown by reference number 520, the UE may determine that the one or more packets of the first connection are received out of order from the one or more packets of the second connection. In some aspects, the UE may determine that the first packet is received out of order based at least in part on the first sequence number and the second sequence number. In some aspects, the UE may determine that the first packet is a stale packet based at least in part on the first sequence number and the second sequence number.

As shown by reference number 525, the UE may determine whether a voice call is ongoing. For example, the UE may determine whether a voice call is ongoing via the first connection (e.g., a voice over LTE call or voice over NR call, among other examples) or via the second connection (e.g., a voice over LTE call or voice over NR call, among other examples).

As shown by reference number 530, the UE may determine to transmit an indication of radio link failure. In some aspects, the UE may determine to transmit the indication of radio link failure based at least in part on the determination that the first packet is received out of order and/or that a voice call is not ongoing. In some aspects, the UE may determine to transmit the indication of radio link failure after the voice call is ended.

In some aspects, the UE may determine to transmit the indication of radio link failure based at least in part on a number of packets that have been received out of order via the first connection satisfying an out of order threshold. For example, after a configured number of packets have been received out of order, the UE may transmit the indication of radio link failure. In some aspects, using the out of order threshold may conserve computing, network, communication, and power resources that may otherwise be consumed to indicate a radio link failure and perform a radio link recovery procedure when unnecessary.

As shown by reference number 535, the UE may transmit an indication of radio link failure to the first base station. As shown by reference number 540, the UE may transmit an indication of radio link failure to the second base station. In some aspects, transmission of the indication of radio link failure may trigger a radio link failure and radio link recovery process. The radio link failure and radio link recovery processes may include exchanging RRC configuration messages, transmitting a capability report, measuring reference signals, transmitting a measurement report, and performing a dual connectivity SCG cell addition operation.

As shown by reference number 545, the UE may determine to transmit an indication that the UE does not support dual connectivity mode. In some aspects, the UE may determine to transmit the indication that the UE does not support dual connectivity mode based at least in part on a number of transmissions of the indication of radio link failure satisfying a radio link failure threshold. For example, after a configured number of transmissions of indications of radio link failure, the UE may transmit the indication that the UE does not support dual connectivity mode. In some aspects, using the radio link failure threshold may conserve computing, network, communication, and power resources that may otherwise be consumed to repeatedly attempt to communicate in dual connectivity mode when the first connection provides data packets out of order from data packets of the second connection.

As shown by reference number 550, the UE may transmit an indication to the first base station that the UE does not support dual connectivity mode. As shown by reference number 555, the UE may transmit an indication to the second base station that the UE does not support dual connectivity mode. In some aspects, the UE may transmit the indication that the UE does not support dual connectivity mode explicitly (e.g., in a capability report) or implicitly (e.g., based at least in part on omitting a measurement report for a dual connectivity SCG cell addition procedure).

Based at least in part on transmitting an indication of radio link failure, the UE may continue to communicate via the second connection without updating a reception window or an HFN to match stale packets of the first connection. In this way, the UE may conserve computing, network, communication, and/or power resources that may have otherwise been used to detect and correct dropped packets and/or errors in reception of subsequent packets based at least in part on the first packet being received out of order.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where the UE (e.g., UE 120) performs operations associated with techniques for recovery from a dual connectivity data stall.

As shown in FIG. 6, in some aspects, process 600 may include receiving, via a first connection of a dual connectivity mode, a first packet having a first sequence number (block 610). For example, the UE (e.g., using reception component 802, depicted in FIG. 8) may receive, via a first connection of a dual connectivity mode, a first packet having a first sequence number, as described above.

As further shown in FIG. 6, in some aspects, process 600 may include receiving, via a second connection of the dual connectivity mode, a second packet having a second sequence number (block 620). For example, the UE (e.g., using reception component 802, depicted in FIG. 8) may receive, via a second connection of the dual connectivity mode, a second packet having a second sequence number, as described above.

As further shown in FIG. 6, in some aspects, process 600 may include determining, based at least in part on the first sequence number and the second sequence number, that the first packet is received out of order (block 630). For example, the UE (e.g., using determination component 808, depicted in FIG. 8) may determine, based at least in part on the first sequence number and the second sequence number, that the first packet is received out of order, as described above.

As further shown in FIG. 6, in some aspects, process 600 may include maintaining a packet order for reception of subsequent packets via the first connection or the second connection (block 640). For example, the UE (e.g., using reception component 802 and or determination component 808, depicted in FIG. 8) may maintain a packet order for reception of subsequent packets via the first connection or the second connection, as described above.

As further shown in FIG. 6, in some aspects, process 600 may include dropping the first packet based at least in part on the determination that the first packet is received out of order (block 650). For example, the UE (e.g., using reception component 802 and or determination component 808, depicted in FIG. 8) may drop the first packet based at least in part on the determination that the first packet is received out of order, as described above.

Process 600 may include additional aspects, such as any single aspect or any combination of aspects described below and/or in connection with one or more other processes described elsewhere herein.

In a first aspect, the determination that the first packet is received out of order comprises determining a first value of a first HFN counter that is associated with the first connection, determining a second value of a second HFN counter that is associated with the second connection, determining that the first value passes an HFN decipher associated with the first HFN counter, and determining that the second value passes an HFN decipher associated with the second HFN counter.

In a second aspect, alone or in combination with the first aspect, process 600 includes determining to drop the first packet and maintain the packet order for reception of subsequent packets based at least in part on the first value being a valid HFN number.

In a third aspect, alone or in combination with one or more of the first and second aspects, process 600 includes determining that the first packet is a stale packet based at least in part on the first sequence number and the second sequence number.

In a fourth aspect, alone or in combination with one or more of the first through third aspects, the maintenance of the packet order for reception of subsequent packets comprises maintaining a reception window for reception of the subsequent packets.

In a fifth aspect, alone or in combination with one or more of the first through fourth aspects, the first connection is associated with a first RAT and the second connection is associated with a second RAT that is different from the first RAT.

In a sixth aspect, alone or in combination with one or more of the first through fifth aspects, the first connection is associated with a first frequency bandwidth and the second connection is associated with a second frequency bandwidth that is different from the first frequency bandwidth.

In a seventh aspect, alone or in combination with one or more of the first through sixth aspects, the determination that the first packet is received out of order is based at least in part on the first sequence number and the second sequence number satisfying a sequence number threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with various aspects of the present disclosure. Example process 700 is an example where the UE (e.g., UE 120) performs operations associated with techniques for recovery from a dual connectivity data stall.

As shown in FIG. 7, in some aspects, process 700 may include receiving, via a first connection of a dual connectivity mode, a first packet having a first sequence number (block 710). For example, the UE (e.g., using reception component 802, depicted in FIG. 800) may receive, via a first connection of a dual connectivity mode, a first packet having a first sequence number, as described above.

As further shown in FIG. 7, in some aspects, process 700 may include receiving, via a second connection of the dual connectivity mode, a second packet having a second sequence number (block 720). For example, the UE (e.g., using reception component 802, depicted in FIG. 8) may receive, via a second connection of the dual connectivity mode, a second packet having a second sequence number, as described above.

As further shown in FIG. 7, in some aspects, process 700 may include determining, based at least in part on the first sequence number and the second sequence number, that the first packet is received out of order (block 730). For example, the UE (e.g., using determination component 808, depicted in FIG. 8) may determine, based at least in part on the first sequence number and the second sequence number, that the first packet is received out of order, as described above.

As further shown in FIG. 7, in some aspects, process 700 may include transmitting an indication of radio link failure based at least in part on the determination that the first packet is received out of order (block 740). For example, the UE (e.g., using transmission component 804, depicted in FIG. 8) may transmit an indication of radio link failure based at least in part on the determination that the first packet is received out of order, as described above.

Process 700 may include additional aspects, such as any single aspect or any combination of aspects described below and/or in connection with one or more other processes described elsewhere herein.

In a first aspect, process 700 includes determining that a voice call is ongoing via the first connection or the second connection and determining to transmit the indication of radio link failure after the voice call is ended.

In a second aspect, alone or in combination with the first aspect, process 700 includes determining a number of packets, including the first packet, that have been received out of order via the first connection, determining that the number of packets satisfies an out of order threshold, and determining to transmit the indication of radio link failure based at least in part on the number satisfying the out of order threshold.

In a third aspect, alone or in combination with one or more of the first and second aspects, process 700 includes determining a number of transmissions of the indication of radio link failure, determining that the number satisfies a radio link failure threshold, and determining to transmit an indication that the UE does not support dual connectivity.

In a fourth aspect, alone or in combination with one or more of the first through third aspects, process 700 includes determining a number of transmissions of the indication of radio link failure, determining that the number satisfies a radio link failure threshold, and determining to omit a measurement report for a dual connectivity second cell group cell addition procedure.

In a fifth aspect, alone or in combination with one or more of the first through fourth aspects, the first connection is associated with a first RAT and the second connection is associated with a second RAT that is different from the first RAT.

In a sixth aspect, alone or in combination with one or more of the first through fifth aspects, the first connection is associated with a first frequency bandwidth and the second connection is associated with a second frequency bandwidth that is different from the first frequency bandwidth.

In a seventh aspect, alone or in combination with one or more of the first through sixth aspects, the determination that the first packet is received out of order is based at least in part on the first sequence number and the second sequence number satisfying a sequence number threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
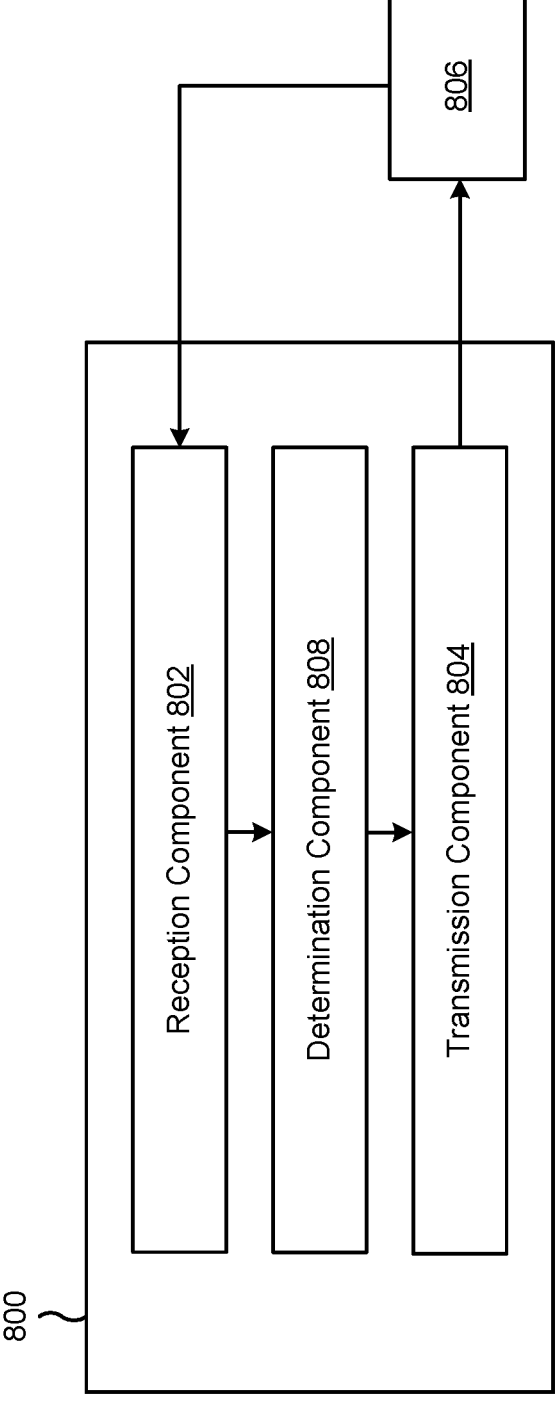
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, via a first connection of a dual connectivity mode, a first packet having a first sequence number. The reception component 802 may receive, via a second connection of the dual connectivity mode, a second packet having a second sequence number. The determination component 808 may determine, based at least in part on the first sequence number and the second sequence number, that the first packet is received out of order. The reception component 802 and or determination component 808 may maintain a packet order for reception of subsequent packets via the first connection or the second connection. The reception component 802 and or determination component 808 may drop the first packet based at least in part on the determination that the first packet is received out of order.

The determination component 808 may determine to drop the first packet and maintain the packet order for reception of subsequent packets based at least in part on the first value being a valid HFN number.

The determination component 808 may determine that the first packet is a stale packet based at least in part on the first sequence number and the second sequence number.

The reception component 802 may receive, via a first connection of a dual connectivity mode, a first packet having a first sequence number. The reception component 802 may receive, via a second connection of the dual connectivity mode, a second packet having a second sequence number. The determination component 808 may determine, based at least in part on the first sequence number and the second sequence number, that the first packet is received out of order. The transmission component 804 may transmit an indication of radio link failure based at least in part on the determination that the first packet is received out of order.

The determination component 808 may determine that a voice call is ongoing via the first connection or the second connection.

The determination component 808 may determine to transmit the indication of radio link failure after the voice call is ended.

The determination component 808 may determine a number of packets, including the first packet, that have been received out of order via the first connection. The determination component 808 may determine that the number of packets satisfies an out of order threshold. The determination component 808 may determine to transmit the indication of radio link failure based at least in part on the number satisfying the out of order threshold.

The determination component 808 may determine a number of transmissions of the indication of radio link failure. The determination component 808 may determine that the number satisfies a radio link failure threshold. The determination component 808 may determine to transmit an indication that the UE does not support dual connectivity.

The determination component 808 may determine a number of transmissions of the indication of radio link failure. The determination component 808 may determine that the number satisfies a radio link failure threshold. The determination component 808 may determine to omit a measurement report for a dual connectivity second cell group cell addition procedure.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
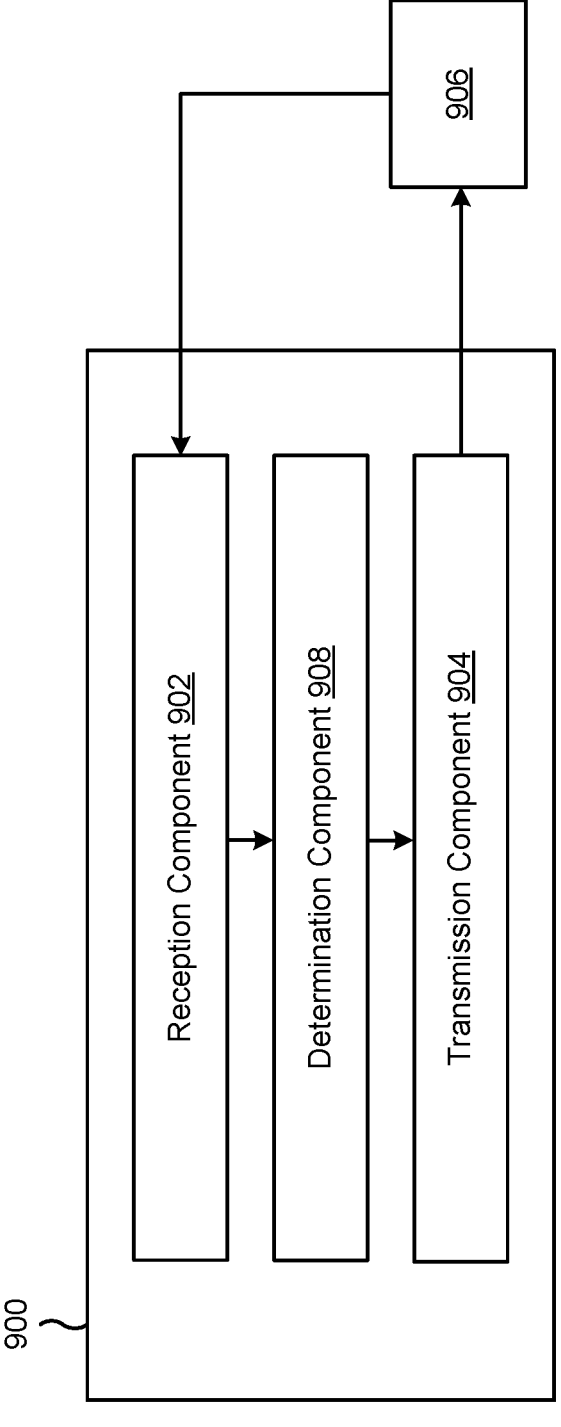

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 4 and 5. Additionally, or alternatively, the apparatus 900 may be configured to perform one or more processes described herein. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digitalto-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, via a first connection of a dual connectivity mode, configuration information indicating that the UE is to maintain a packet order for reception of particular packets;

receiving, via the first connection, a first packet having a first sequence number;

receiving, via a second connection of the dual connectivity mode, a second packet having a second sequence number, wherein the first sequence number and the second sequence number indicate that the first packet is received out of order;

maintaining, when receiving packets subsequent to the first packet or the second packet, via the first connection or the second connection, the packet order;

dropping the first packet based at least in part on the first packet being received out of order; and communicating, via the second connection, based at least in part on dropping the first packet, without updating a reception window or a hyper frame number (HFN) to match the dropped first packet.

2. The method of claim 1, wherein:

a first value of a first HFN counter is associated with the first connection, a second value of a second HFN counter is associated with the second connection, the first value passes an HFN decipher associated with the first HFN counter, and the second value passes an HFN decipher associated with the second HFN counter.

3. The method of claim 2, further comprising:

dropping the first packet and maintaining the packet order based at least in part on the first value being a valid HFN number.

4. The method of claim 1, wherein the first packet is a stale packet based at least in part on the first sequence number and the second sequence number.

5. The method of claim 1, wherein the configuration information indicates that the UE is to refrain from reordering the reception window.

6. The method of claim 1, wherein the first connection is associated with a first radio access technology (RAT) and the second connection is associated with a second RAT that is different from the first RAT.

7. The method of claim 1, wherein the first connection is associated with a first frequency bandwidth and the second connection is associated with a second frequency bandwidth that is different from the first frequency bandwidth.

8. The method of claim 1, wherein the first packet is received out of order based at least in part on the first sequence number and the second sequence number satisfying a sequence number threshold.

9. A method of wireless communication performed by a user equipment (UE), comprising:

receiving configuration information indicating that the UE is to transmit an indication of a radio link failure based at least in part on one or more data packets being received out of order;

receiving, via a first connection of a dual connectivity mode, a first packet having a first sequence number;

receiving, via a second connection of the dual connectivity mode, a second packet having a second sequence number, wherein the first sequence number and the second sequence number indicate that the first packet is received out of order;

transmitting the indication of the radio link failure based at least in part on the first packet being received out of order; and communicating, via the second connection, based at least in part on transmitting the indication of the radio link failure, without updating a reception window or a hyper frame number (HFN) to match one or more packets of the first connection.

10. The method of claim 9, further comprising:

transmitting the indication of the radio link failure after a voice call, via the first connection or the second connection, is ended.

11. The method of claim 9, wherein:

a number of packets, including the first packet, have been received out of order via the first connection;

the number of packets satisfies an out of order threshold; and the indication of the radio link failure is transmitted based at least in part on the number satisfying the out of order threshold.

12. The method of claim 9, further comprising:

transmitting an indication that the UE does not support dual connectivity, wherein a number of transmissions of the indication of the radio link failure satisfies a radio link failure threshold.

13. The method of claim 9, further comprising:

omitting a measurement report for a dual connectivity second cell group cell addition procedure, wherein a number of transmissions of the indication of the radio link failure satisfies a radio link failure threshold.

14. The method of claim 9, wherein the first connection is associated with a first radio access technology (RAT) and the second connection is associated with a second RAT that is different from the first RAT.

15. The method of claim 9, wherein the first connection is associated with a first frequency bandwidth and the second connection is associated with a second frequency bandwidth that is different from the first frequency bandwidth.

16. The method of claim 9, wherein the first packet is received out of order based at least in part on the first sequence number and the second sequence number satisfying a sequence number threshold.

17. A user equipment (UE) for wireless communication, comprising:

one or more memories; and one or more processors operatively coupled to the one or more memories, the one or more memories and the one or more processors configured to:

receive, via a first connection of a dual connectivity mode, configuration information indicating that the UE is to maintain a packet order for reception of particular packets;

receive, via the first connection, a first packet having a first sequence number;

receive, via a second connection of the dual connectivity mode, a second packet having a second sequence number, wherein the first sequence number and the second sequence number indicate that the first packet is received out of order;

maintain, when receiving packets subsequent to the first packet or the second packet, via the first connection or the second connection, the packet order;

drop the first packet based at least in part on the first packet being received out of order; and communicate, via the second connection, based at least in part on dropping the first packet, without updating a reception window or a hyper frame number (HFN) to match the dropped first packet.

18. The UE of claim 17, wherein:

a first value of a first HFN counter is associated with the first connection, a second value of a second HFN counter is associated with the second connection, the first value passes an HFN decipher associated with the first HFN counter, and the second value passes an HFN decipher associated with the second HFN counter.

19. The UE of claim 18, wherein the one or more processors are further configured to:

drop the first packet and maintain the packet order based at least in part on the first value being a valid HFN number.

20. The UE of claim 17, wherein the first packet is a stale packet based at least in part on the first sequence number and the second sequence number.

21. The UE of claim 17, wherein the configuration information indicates that the UE is to refrain from reordering the reception window.

22. The UE of claim 17, wherein the first connection is associated with a first radio access technology (RAT) and the second connection is associated with a second RAT that is different from the first RAT.

23. The UE of claim 17, wherein the first connection is associated with a first frequency bandwidth and the second connection is associated with a second frequency bandwidth that is different from the first frequency bandwidth.

24. A user equipment (UE) for wireless communication, comprising:

one or more memories; and one or more processors operatively coupled to the one or more memories, the one or more memories and the one or more processors configured to:

receive configuration information indicating that the UE is to transmit an indication of a radio link failure based at least in part on one or more data packets being received out of order;

receive, via a first connection of a dual connectivity mode, a first packet having a first sequence number;

receive, via a second connection of the dual connectivity mode, a second packet having a second sequence number, wherein the first sequence number and the second sequence number indicate that the first packet is received out of order;

transmit the indication of the radio link failure based at least in part on the first packet being received out of order; and communicate, via the second connection, based at least in part on transmitting the indication of the radio link failure, without updating a reception window or a hyper frame number (HFN) to match one or more packets of the first connection.

25. The UE of claim 24, wherein the one or more processors are further configured to:

transmit the indication of the radio link failure after a voice call, via the first connection or the second connection, is ended.

26. The UE of claim 24, wherein the one or more processors are further configured to:

transmit the indication of the radio link failure based at least in part on a number of packets, including the first packet, that have been received out of order via the first connection, satisfying an out of order threshold.

27. The UE of claim 24, wherein the one or more processors are further configured to:

transmit an indication that the UE does not support dual connectivity, wherein a number of transmissions of the indication of the radio link failure satisfies a radio link failure threshold.

28. The UE of claim 24, wherein the one or more processors are further configured to:

omit a measurement report for a dual connectivity second cell group cell addition procedure, wherein a number of transmissions of the indication of the radio link failure satisfies a radio link failure threshold.

29. The UE of claim 24, wherein the first connection is associated with a first radio access technology (RAT) and the second connection is associated with a second RAT that is different from the first RAT.

30. The UE of claim 24, wherein the first connection is associated with a first frequency bandwidth and the second connection is associated with a second frequency bandwidth that is different from the first frequency bandwidth.

* * * * *